United States Patent Office 3,626,713
Patented Dec. 14, 1971

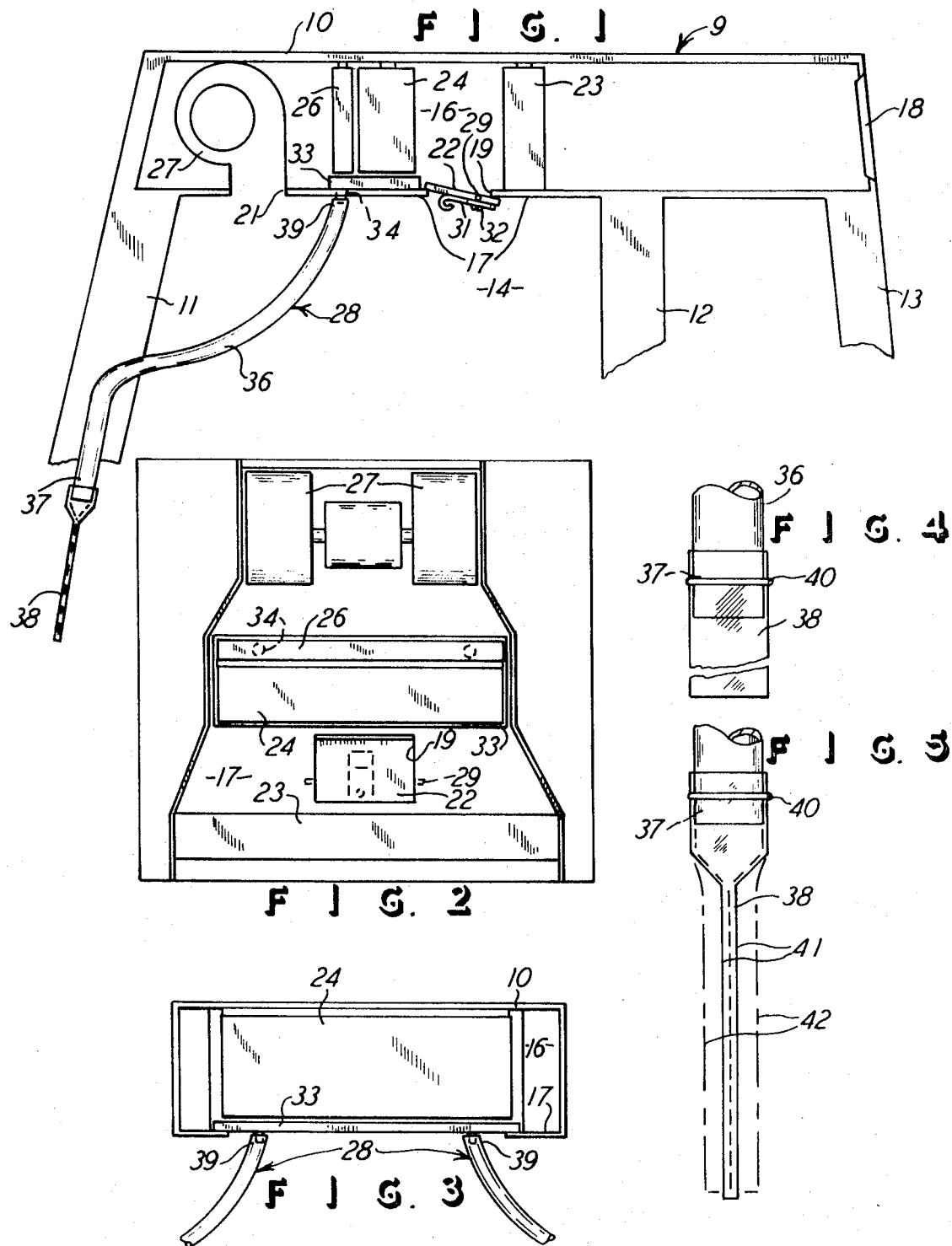

3,626,713
VEHICLE CAB AIR CONDITIONING SYSTEM
Phillip G. Venable, Orion, Ill., assignor to
J. I. Case Company, Racine, Wis.
Filed Apr. 23, 1970, Ser. No. 31,271
Int. Cl. F25d 17/04
U.S. Cl. 62—187                                    6 Claims

ABSTRACT OF THE DISCLOSURE

A vehicle cab having an air conditioning compartment contiguous to the cab and having an evaporator with an air blower on one side and an air filter on the other side, and all being disposed in the compartment. A condensate drain tray is disposed in the compartment beneath the evaporator, and a drain tube extends from the tray to a location outside the vehicle enclosure. The drain tube has an atmospheric air responsive control which automatically closes when there is air pressure differential between the air conditioning compartment and the outside. This prevents air from flowing into the drain tube and into the compartment, and it also thus permits the condensate to drain from the tube and not be detained by the air pressure differential Also, a regulator door is provided on the .compartment for recirculation of air from the cab enclosure and to the compartment, and the door provides a control for the air pressure differential between the cab enclosure and the compartment.

VEHICLE CAB AIR CONDITIONING SYSTEM

This invention relates to a vehicle cab air conditioning system, and, more especially, it has application to a tractor cab which commonly has the air conditioning unit and compartment located above the cab enclosure, so the application is described in that context.

BACKGROUND OF THE INVENTION

It is common practice to provide an air conditioner in a vehicle cab, such as an agricultural tractor cab. The air conditioner is located in a compartment contiguous to the vehicle cab enclosure where the operator sits. There are problems in the drainage of the air conditioning condensate, and in the atmospheric pressure existing in the air conditioning compartment. Specifically, the air conditioning system includes an evaporator with an air filter on one side and an air blower on the other side of the evaporator. The arrangement is such that a slight vacuum is created between the air filter and the blower. Because of the vacuum, it is a problem in draining the water condensate from the air conditioning compartment, and it is also a problem in preventing dust, dirt, and other contamination from entering the compartment, possibly even through the drain tube. That is, since the condensate tray is located in the compartment which is under vacuum conditions, and the terminal end of the drain tube is located outside the cab where there is atmospheric pressure, the condensate cannot always drain from the tray, unless there is considerable condensate in the tray, and it is then subject to spilling, and the excess collection of condensate in the tray presents other various problems.

Specifically, the vacuum created by the air blower is considered to be equal to approximately one inch of water, so there must be at least one inch of condensate in the tray before there will be any condensate draining from the tray. This presents a problem in that there is then this excessive amount of water retained in the tray. Another problem is that when air can move up the drain tube, as mentioned above, there is a chance of the dust and dirt clogging the tube, as well as having the dust and dirt getting to the working parts of the air conditioning system and the dust and dirt also by-passes the air filter and then is blown directly into the cab enclosure, and this could even include the undesirable introduction of engine exhaust into the cab enclosure.

Further, with regard to tractor cabs, it must be remembered that the cab is preferably made substantially air tight so that the dust and dirt of farming conditions are not permitted to seep into the cab enclosure. However, the substantially air-tight condition of the cab enclosure hampers the efficiency of the air conditioning system in that the cab enclosure actually becomes slightly air pressurized, and the movement of air is then limited. Therefore, it is desirable to have the vehicle cab enclosure free from external dust and dirt, but to also have it arranged so that it will not be unduly pressurized and thereby hamper the efficiency of the air conditioning system.

It is a primary object of this invention to solve the aforementioned problems, and to do so with reliable, expedient, and efficient means which provide for the adequate drainage of condensate and which also provide for maximum efficiency of the air conditioning system by avoiding unduly pressurizing the cab enclosure. It will therefore also be understood that the control of air pressure in the air conditioning compartment provides a means for the drainage of condensate and also for relieving the air pressure in the vehicle enclosure so that, not only is the condensate drained, but air conditioning system can operate at peak efficiency.

BRIEF DESCRIPTION OF THE DRAWINGS

FIG. 1 is a diagrammatic view of a vehicle cab and the air conditioning system of this invention.
FIG. 2 is a top plan view of a portion of FIG. 1.
FIG. 3 is a rear elevational view of a portion of FIG. 1.
FIG. 4 is an enlarged view of a fragment of the terminal end of the drain tube.
FIG. 5 is a view similar to FIG. 4, but showing the terminal end of the drain tube in full and showing it in dot-dash lines representing the position of the tube when condensate is flowing therethrough.

DETAILED DESCRIPTION OF THE PREFERRED EMBODIMENT

A vehicle cab is designated 9 and is of a conventional nature, as shown in FIG. 1. The upper portion of the cab is shown, and it will be understood that the vehicle has a roof 10 and an upright supporting column 11, one 12, and one 13. The vehicle may be an agricultural tractor, and the details of the construction are well known to anyone skilled in the art. The cab 9 defines an operator's enclosure, designated 14, and it includes the usual side walls and floor, and the cab also defines the air conditioning compartment, designated 16. The compartment 16 is defined by the vehicle cab roof 10 and a floor 17 which is a divider between the enclosure 14 and the compartment 16. It will of course be understood that the compartment 16 is substantially air tight, except for the air inlet passage 18, permitting air to enter from outside the vehicle. Also, the compartment 16 has an inlet passage 19 and an outlet passage designated 21. The inlet passage 19 extends between the vehicle enclosure 14 and the compartment 16, so air can flow upwardly into the compartment 16, except for the control door 22 which will be described later. Also, air can flow from the compartment 16 to the enclosure 14, and such flow is through the opening 21.

The drawings further show that a conventional type of air filter 23 is disposed in the compartment 16, and an air evaporator 24 and an air heater 26 and an air blower 27 are also disposed in the compartment 16. Thus, it will be understood that air can enter the compartment 16 through the outside inlet 18, and air will then flow through the filter 23 and across the evaporator 24 and be blown by the blower 27 into the cab enclosure 14, all in a conventional manner.

The action of the blower 27 creates a slight vacuum between the blower 27 and the filter 23. This vacuum is the cause of the problems mentioned, and the special arrangement and provision of the air re-circulating door 22 and the special arrangement and provision of the drain tube, generally designated 28, serve to solve and answer the problems mentioned.

The door 22 is pivotally mounted on the compartment floor 17 by means of the trunnions 29, and the door can open relative to the passageway 19, and air can then flow from the enclosure 14 and into the compartment 16. It will be noted that the door 22 is located between the filter 23 and the blower 27, so air moving from the enclosure 14 will relieve pressure in the enclosure 14 and will also relieve the vacuum in the compartment 16. There is no problem with regard to by-passing the filter 23, since the door 22 is simply an air re-circulating door, and the air has already been cooled and filtered. Further, there is an adjustment 31 which is movably held to the door 22 by means of a screw 32, so the adjustment 21 is a counter-weight which permits balancing of the door 22 about its offset trunnions 19 so that the air pressure balance between the enclosure 14 and the compartment 16 can be governed.

A condensate drain tray 33 is shown in the compartment 16 and disposed beneath the evaporator 24. Of course the air passing across the evaporator 24 will be cooled and condensate will therefore collect on the evaporator and the condensate will ultimately flow into the tray 33 and collect there. The drain tube 28 connects to a spout 34 on the bottom of the tray 33, and the condensate can be drained from the tray 33 and passed through the drain tube 28 and along the vehicle column 11 and externally of the vehicle cab 9. It will of course be understood that the compartment 16 is located overhead with regard to the operator's enclosure 14, so the drain tube 28 must be provided to dispose of the condensate at a location outside of and lower than the position of the compartment 16. The drain tube 28 consists of a first section 36, and this section may be of a firm substance, such as a rubber or plastic hose, or it could of course be a metal tube. However, it will be understood that the terminal end 37 of the tube 36 is exposed to atmospheric pressure, while the pressure in the compartment 16 is below atmospheric, and the condensate can therefore not readily drain through the drain tube 28. In answer to this problem, the present solution is to provide a type of atmospheric responsive means which will prevent the air pressure differential at the opposite ends of the tube 28. Such means may be a type of water trap which will prevent the air pressure differential and which will permit the desired accumulation of one inch of condensate in the tube 28 so that the condensate is of adequate weight to flow downwardly in the tube 28. The drawings show the atmospheric pressure responsive means to be a tube 38 attached to the terminal end of the tube 28 and to be air tight with the tube 28. Further, the tube 38 is of a very thin and highly flexible sheet type material, such as a film or sheet of thin plastic material which will collapse, as shown in FIG. 1 and in full lines in FIG. 5, when there is air pressure differential between the ends 37 and 39 of the tube 28. Upon collapse of the tube 38, the tendency for atmospheric air to flow up the tube 28 is thwarted, and the condensate can then flow down the tube 28.

FIG. 5 shows the condition of the tube 38 when it is in the collapsed condition, as shown by the solid lines designated 41, and with the view of FIG. 5 being an edge view similar to that shown in FIG. 1. FIG. 4 shows the tube 38 from the side, though the tube in FIG. 4 is also again collapsed but shows its wider side since the opposite walls are simply folded together, in the manner that they are shown folded in FIGS. 1 and 5. FIG. 5 then also shows the tube 38 in dotted lines 42, and such is the condition of the tube 38 when the condensate is flowing therethrough and draining from the tray 33. Thus the physical characteristics of the tube 38 are such that the tube may commonly be in the collapsed or folded position shown in the drawings, except for the lines 42 as described, and the tube 38 is sufficiently flexible to respond to the slight air pressure differential at the opposite ends 37 and 39 of the tube 28, so that there will be no air-flow up the tube 28, as mentioned. It has been found that the tube 38 may be of a light-walled plastic of approximately one to three mils wall thickness. Also, it will be seen that the tube 38 can be slipped over the end 37 of the tube 28, and, if necessary or desired, an attaching clamp or the like could be applied to hold the film-like tube 38, such as circular clamp 40.

With the arrangement described, the air regulating door 22 is effective for controlling the efficiency of the system by re-circulating the air from the cab enclosure 14 and to the compartment 16, and such re-circulation also governs the air pressure in the compartment 16. It is the air pressure in the compartment 16 which also is of concern with regard to the drainage of the condensate collected in the tray 33, and here the tube 28 and the extending tube 38 serve to conduct the condensate from the compartment 16 and the tube 38 responds according to the air pressure differential outside the vehicle cab and in the compartment 16.

With regard to the function of the air re-circulation door and the collapsible tube 38, assuming a barometric pressure of 408 inches of water outside the cab, the blower will create a vacuum between the filter 23 and the blower 27 in a pressure of approximately 406½ inches of water or a 1½ inches of water pressure differential. The blower can maintain a pressure in the enclosure 14 of 408.7 inches of water or a 7/10 inch of water difference with regard to the outside atmospheric pressure. However, the cab enclosure 14 can be maintained clean with only a 1/10 inch of water pressure differential, rather than the 7/10 inch of water differential which exists in the example given. Therefore, without the re-circulation door 22, the cab is being unnecessarily pressurized, and the air conditioning system is therefore not permitted to operate at peak efficiency. The counter-balance 31 on the door 22 can therefore be adjusted so that the pressure inside the cab 9 is maintained at 408.1 inches of water.

Also, the pressure figures given above are effective for collapse of the flexible tube 38 which therefore is of a flexibility which responds to the pressure differential of 15/10 inches of water. That is, if the pressure in the enclosure 14 and the compartment 16 were such that there would be a 1½ inches of water pressure differential between the outside atmosphere and the pressure in the compartment 16, the opposite ends 37 and 39 of the tube 28 would be subjected to the pressure differential, and the tube 38 would respond by collapsing so that there would be no flow of air up the tube 28. Further, as previously mentioned, the tube 38 can be normally folded or collapsed, as shown in the full line positions of the showing of tube 38 in FIGS. 1, 4 and 5, so even the 1/10 inch pressure differential will not be effective to permit the hampering of the flow of condensate from the tray 33. The tube 38 therefore serves as a water trap, such as when the tube 38 is applied and effective to close the tube portion 36 to the updraft of air, water can collect in the tube 28 such that the one inch or 1½ inch, or whatever the pressure differential may be, of the column of water can collect in the tube and then is effective to exert its force downwardly and against the trap 38 and thereby be exhausted from the tray 33. Also, the trap 38 is normally closed to the inlet of air into the tube 36 and from the outside. Thus, the 1/10 inch water pressure differential will not create that pressure differential at the tube ends 37 and 39. So condensate will flow down the tube 36 and open the tube 38.

What is claimed is:

1. A vehicle cab air conditioning system, comprising a vehicle cab having an operator's enclosure and a compartment contiguous to said enclosure, a partition extending between said enclosure and said compartment for blocking air flow therebetween, an air temperature conditioner disposed in said compartment, an air blower and an air filter disposed in said compartment on opposite sides of said air temperature conditioner for the passage of air through said air filter and across said air temperature conditioner and said blower, said compartment having an air passageway between said enclosure and said compartment on each side of said air temperature conditioner relative to the flow of air across said air temperature conditioner and being the only air passageways for the inlet and outlet of air relative to both said enclosure and said compartment, and an air-pressure responsive door on said enclosure and operative on said air passageway of the outlet for said enclosure for self opening and closing in response to air pressure in said enclosure and as determined by the flow of air from said compartment.

2. The vehicle cab air conditioning system as claimed in claim 1, including adjustable door closure means on said door for setting said means at selected positions to have said door open and close according to the settings.

3. The vehicle cab air conditioning system as claimed in claim 1, wherein said door is located in a position to relieve said enclosure of air and to direct the relieved air into said air inlet of said compartment, under the influence of said blower.

4. A vehicle cab air conditioning system, comprising a vehicle cab having an operator's enclosure and a compartment located above said enclosure, an evaporator disposed in said compartment, an air blower and an air filter disposed in said compartment on opposite sides of said evaporator for the passage of air through said air filter and across said evaporator and said blower, said compartment having an air passageway between said enclosure and said compartment on each side of said evaporator relative to the flow of air across said evaporator and for the inlet and outlet of air relative to said compartment, a condensate drain pan disposed in said compartment beneath said evaporator, a condensate drain tube extending from said pan to a location at a level lower than that of said enclosure and to a location outside of said compartment for conducting condensate through said tube and out of said compartment, and said condensate drain tube having atmospheric pressure-responsive means movable in response to air pressure differential between the inside and the outside of said compartment for closing said tube to the flow of air into said compartment, said means being movable also in response to the flow of water in said tube and from said tray for opening said tube for drainage of the water from said tray, and an air recirculation door operative on said air passageway inlet for said compartment for governing the flow of air from said enclosure into said compartment and thereby govern the air pressure on said condensate in said tray to counter the amount of vacuum otherwise established in said compartment by said blower.

5. The vehicle cab air conditioning system as claimed in claim 4, including counterweight means on said air recirculation door for automatically setting the position of openness of said door relative to said air passageway inlet and in accordance with any vacuum in said compartment to control the pressure of air in said compartment and thereby be effective on any condensate in said tray.

6. The vehicle cab air conditioning system as claimed in claim 4, wherein said atmospheric pressure responsive means is a thin-walled and flexible tubing on the extending terminal end of said condensate drain tube, and said tubing being flexible to collapse in response to air pressure of 1.5 inches of water to preclude air flow therethrough.

References Cited
UNITED STATES PATENTS

| | | | |
|---|---|---|---|
| 3,035,422 | 5/1962 | Holbrisen | 62—408 |
| 3,373,578 | 3/1968 | Feeney | 62—289 |
| 2,662,724 | 12/1953 | Kravogna | 137—525.1 |
| 2,736,176 | 2/1956 | Cartloy | 62—408 |
| 1,263,830 | 4/1918 | Wolf | 98—119 |
| 2,060,289 | 11/1936 | Downs | 98—119 |
| 2,388,253 | 11/1945 | Dody | 98—119 |
| 2,502,736 | 4/1950 | Inarcoe | 98—119 |

WILLIAM J. WYE, Primary Examiner

U.S. Cl. X.R.

98—119; 62—408, 239, 289; 137—525.1